Patented Sept. 28, 1943

UNITED STATES PATENT OFFICE 2,330,758

GEOCHEMICAL PROSPECTING

Millard S. Taggart, Jr., Houston, Tex., assignor to Standard Oil Development Company, a corporation of Delaware No Drawing. Application December 26, 1940, Serial No. 371,825

4 Claims. (Cl. 23—232)

The present invention is directed to a method for prospecting for subterranean petroleum deposits and particularly to that method according to which samples of soil gas are recovered and analyzed for hydrocarbons, preferably those heavier than methane.

Prospecting for oil by analysis of soil gas for hydrocarbons has, in the past, been conducted either by sucking a sample of soil gas from the earth in situ or by collecting samples of soil, usually at depths in excess of about 5 feet, and generally at depths of at least 20 feet, and recovering a gas sample from the soil sample. In each case, it has been discovered that the quantity of hydrocarbons recovered can be increased by treating the soil either in situ or as a sample with a strong mineral acid such as hydrochloric acid.

In the practice of these methods, by treating the soil with acid, it has been found that samples of soil which yield small quantities of carbon dioxide upon treatment with acid, also yield small quantities of hydrocarbons. It has been found further that a sample which yields only small quantities of both these ingredients will, if first treated with a soluble salt of carbonic acid, yield greater quantities of hydrocarbons upon treatment with strong mineral acid.

According to the present invention, therefore, soil which is to be treated with acid for the recovery therefrom of a hydrocarbon gas sample, is first soaked or impregnated with a solution of a water soluble salt of carbonic acid, such as sodium bicarbonate. When the soil gas is recovered from the soil in situ, it is desirable, after preparing a hole and a collection receptacle, first to fill the hole with a bicarbonate solution which is left in place for a period of time, preferably under pressure. Then the bicarbonate solution is pumped out and acid is introduced into the hole, with the result that a copious volume of gas is evolved.

When the soil sample technique is followed, the soil sample is first lixiviated with the bicarbonate solution and then treated with mineral acid. The mineral acid can be added directly to the suspension of soil in bicarbonate solution or the soil can be filtered from the bicarbonate solution and then treated with the acid.

As a specific illustration of the nature and magnitude of the effect of the treatment with the soluble carbonate, mention may be made of soil samples which, when treated in the ordinary way with hydrochloric acid, yielded a gas containing about 5 parts per million of ethane and heavier hydrocarbons. The same soil samples, when first soaked with sodium bicarbonate and then treated with hydrochloric acid, yielded a gas containing about 15 parts per million of ethane and higher hydrocarbons.

While specific mention has been made in the above discussion of the use of water-soluble salts of carbonic acid, it will be understood that the same result can be achieved by using other water-soluble salts which, upon treatment with mineral acid, decompose with the evolution of a gas. For example, water-soluble sulfites and sulfides are adaptable for use according to the present invention. Carbonates are preferred because the ordinary gas analyzing apparatus that is used in soil gas prospecting is provided with means adapted for the removal of carbon dioxide from the gas preliminary to combustion. If a water-soluble salt other than a carbonate is employed, the gas analyzing apparatus must be provided with purifying means for removing from the gas sample the gas which is generated by treatment of the water-soluble salt with acid.

Some of the benefits arising out of the present invention can be realized by mixing with a dry soil sample a dry substance, such as calcium carbonate, which, upon treatment with acid, will generate a gas. It will be understood that this technique is useful only in connection with soil samples and not with the treatment of soil in place. When this procedure is followed, care must be taken to pulverize the soil sample together with the dry gas producing substance in such a way as to form an intimate mixture of the two. It may be stated that the same increase in evolved hydrocarbons cannot be achieved by this dry method as is attainable by the use of solutions of water-soluble substances which yield gas upon treatment with strong mineral acids.

The nature and objects of the present invention having been thus described and illustrated, what is claimed as new and useful and is desired to be secured by Letters Patent is:

1. A method for treating soil for the recovery therefrom of a gas sample which is to be analyzed for components significant of the presence of subterranean petroliferous deposits, which comprises soaking the soil with an aqueous solution of a water-soluble substance which, upon treatment with strong mineral acid, will evolve a gas, then treating the mixture with a strong mineral acid and collecting the evolved gases for analysis.

2. A method for treating a soil sample for the recovery therefrom of a gas to be analyzed for the presence therein of constituents significant of subterranean petroliferous deposits, which comprises intimately mixing with the soil a substance which, upon treatment with strong mineral acid, evolves a gas other than a hydrocarbon gas, treating the mixture with a strong mineral acid, and collecting the evolved gas for analysis.

3. A method according to claim 1 in which the substance in aqueous solution is a carbonate.

4. A method according to claim 2 in which the substance mixed with the soil is a carbonate.

MILLARD S. TAGGART, Jr.